United States Patent [19]
Goronszy

[11] Patent Number: 5,989,428
[45] Date of Patent: Nov. 23, 1999

[54] CONTROLLING WASTEWATER TREATMENT BY MONITORING OXYGEN UTILIZATION RATES

[76] Inventor: Mervyn Charles Goronszy, 24751 Greentree La., Lake Forest, Calif. 92630

[21] Appl. No.: 08/973,554

[22] PCT Filed: Jun. 21, 1996

[86] PCT No.: PCT/AU96/00379

§ 371 Date: Dec. 22, 1997

§ 102(e) Date: Dec. 22, 1997

[87] PCT Pub. No.: WO97/00832

PCT Pub. Date: Jan. 9, 1997

[51] Int. Cl.[6] .............................. C02F 3/12; C02F 3/20; C02F 3/30
[52] U.S. Cl. .................. 210/605; 210/607; 210/614; 210/626; 210/96.1; 210/143; 210/195.1; 210/903; 210/921
[58] Field of Search ........................ 210/614, 605, 210/607, 622–629, 96.1, 903, 921, 141–143, 195.1, 195.3

[56] References Cited

U.S. PATENT DOCUMENTS

| | | |
|---|---|---|
| 3,983,031 | 9/1976 | Kirk .......................... 210/614 |
| 4,898,672 | 2/1990 | Clifft et al. .................. 210/614 |
| 5,266,200 | 11/1993 | Reid ........................... 210/614 |
| 5,702,951 | 12/1997 | Bridger ....................... 210/614 |

Primary Examiner—Thomas G. Wyse

[57] ABSTRACT

A method and apparatus for treating waste material to remove selected components form the waste is described using a reactor or a series of reactors in fluid communication with each other for receiving the waste to be treated as influent. The influent forms a biomass including the waste and microorganisms and is treated by controlling the metabolic activity of the microorganisms by monitoring the oxygen utilisation rate or the potential oxygen utilisation rate of the biomass so as to determine the required amount of oxygen to be supplied to the biomass and to determine the period of aeration of the biomass in order to maintain a predetermined oxygen utilisation rate or value so as to remove the selected components of the waste. The preferred selected components to be removed are nitrogenous, carbonaceous and/or biological phosphorus containing materials or derivatives.

32 Claims, 7 Drawing Sheets

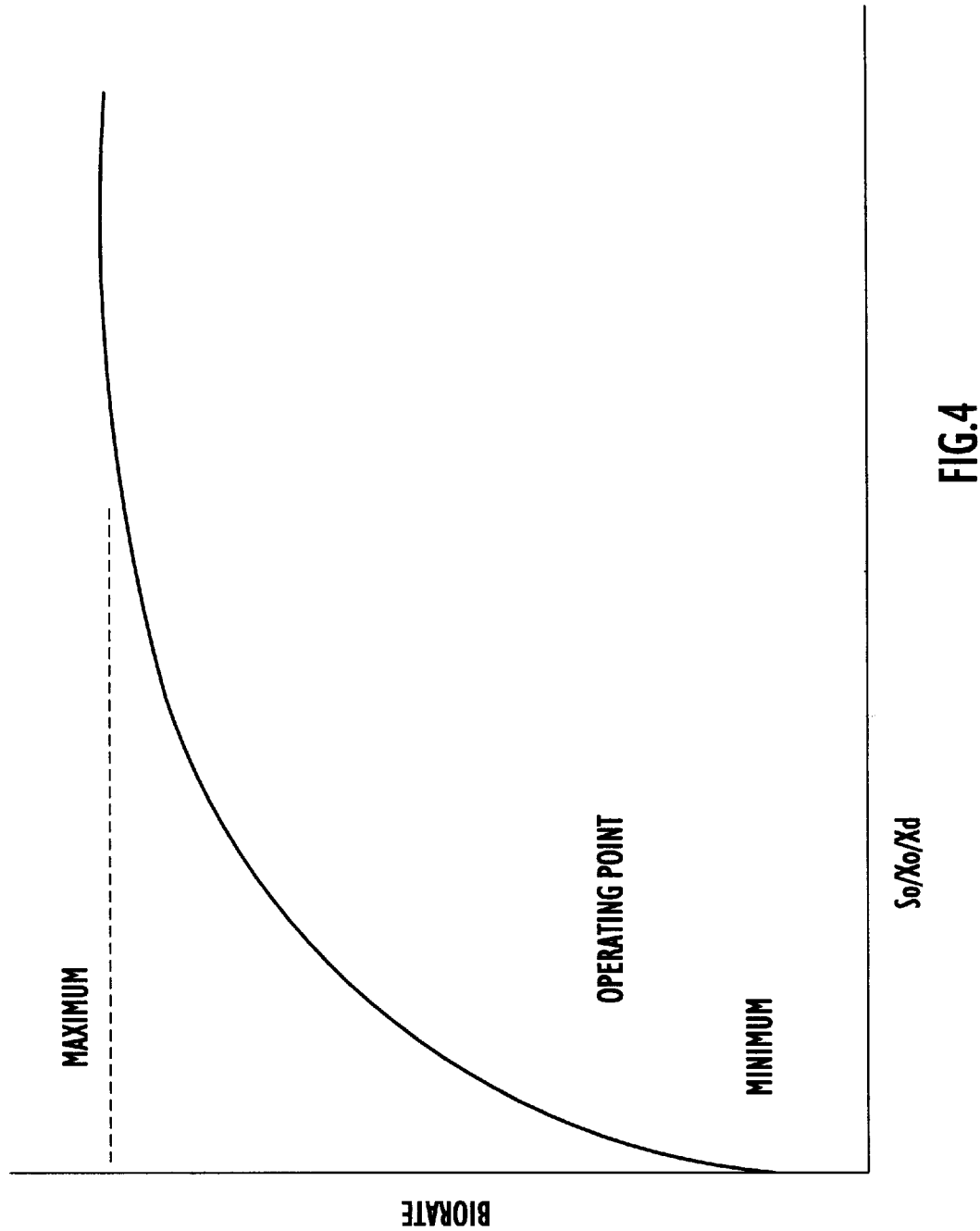

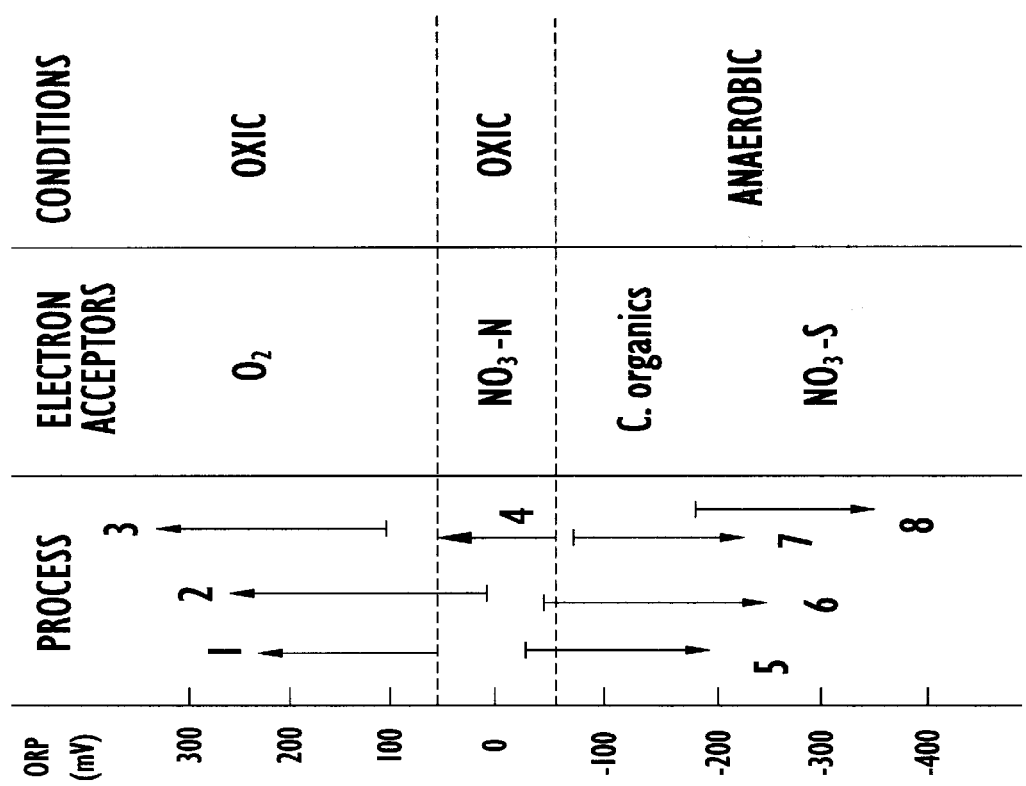

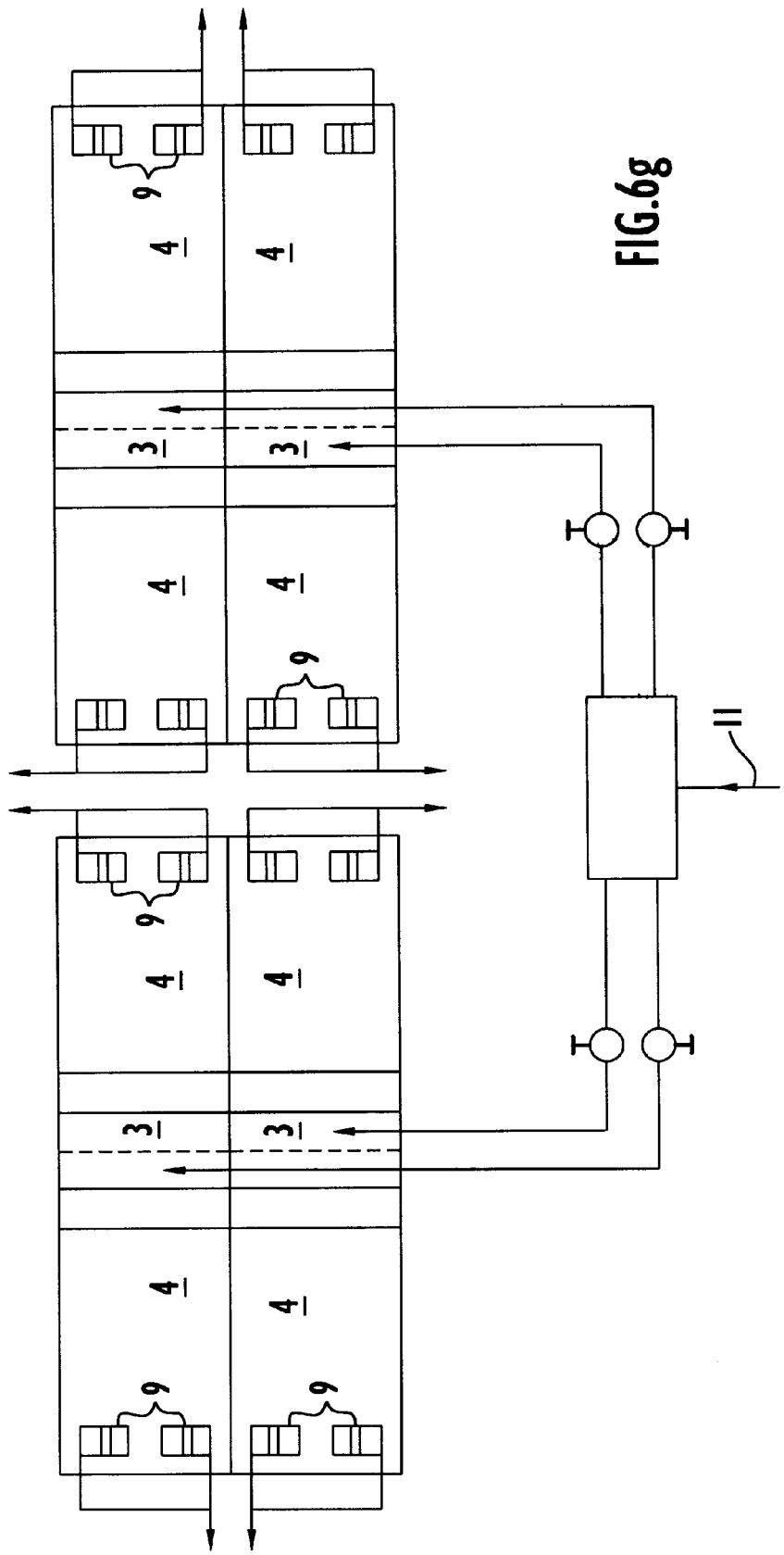

CONTROLLING WASTEWATER TREATMENT BY MONITORING OXYGEN UTILIZATION RATES

This invention relates to improvements in wastewater treatment generally and in particular to wastewater treatment methodology using micro-organisms and means of controlling the metabolic activity of those micro-organisms in a variable volume activated sludge reactor which is intermittently, aerated and decanted. More particularly, the present invention relates to methods and apparatus for controlling the metabolic activity of dispersed growth micro-organisms through the regulated supply of oxygen relative to in basin biomass oxygen uptake rate measurements, to achieve the beneficial result of carbon or carbonaceous material removal, as measured by COD, BOD, TOC; nitrogen removal as measured by TKN, $NH_3$—N, $NO_2$—N, $NO_3$—N; and phosphorous removal, as measured by $PO_4$ from a wastewater. The present invention finds particular application in treating domestic wastewater, industrial wastewater or a mixture thereof. The invention particularly relates to maximising the rate of removal of biologically degradable materials in a wastewater by micro-organisms by optimising the metabolic activity of the micro-organisms that are used in a single sludge reaction procedure. In so doing it in recognised that there are at least four major species or families of micro-organisms in the overall biological consortia that need to be maintained. Those micro-organisms that are generally responsible for the net removal of carbohydrate type compounds, those micro-organisms that generally oxidise nitrogen compounds to nitrate nitrogen, those micro-organisms that generally denitrify nitrate to nitrogen gas and those micro-organisms that generally participate in enhanced biological phosphorus and in the overall hydrolysis of degradable volatile solids to soluble degradable substrate. UP to 20000 individual species of micro-organisms can be contained in the overall consortia constituting the biomass.

Although the present invention will be described with reference to the treatment of industrial wastewater and domestic wastewater and to the methodology of such treatments, it will be appreciated by one skilled in the art that the invention is not limited to such applications and may be used to treat any type of biologically degradable wastewater or otherwise, and any type of waste including water or waste having the specific impurities or contaminants as discussed herein.

Conventional activated sludge processing requires detailed monitoring information on which to base process control decisions to meet treatment objectives. These analyses, which are well known to practitioners of the art, typically include BOD (total), COD (total), BOD (soluble), COD (soluble), TKN, ORG—N, $NO_3$—N, ortho Phosphate, total Phosphate, pH, Alkalinity for both influent and effluent streams. In basin measurements include, Dissolved Oxygen Concentration, Mixed Liquor Suspended Solids Concentration, Mixed Liquor Volatile Suspended Solids Concentration, Sludge Settled Volume, Biomass Degradable Fraction (through aerobic digestion of the biomass for 28 days). Simple parameters, incorporating the Potential Oxygen Utilisation Rate (POUR) and its actual utilisation rate are used for the automatic control and operation of a single activated sludge variable volume reactor in order to achieve a very high degree of carbon, nitrogen, phosphorus removal without sludge bulking.

The present invention relates to activated sludge wastewater treatment, the principal reactor of which is configured for complete-mix operation. While variable volume intermittently aerated and decanted fed-batch operation can be used as the preferred embodiment, the technique also applies to constant volume continuously aerated complete-mix operation. The keywords are fed-batch, intermittently aerated, complete-mix, reactor basin. In this invention there maybe a series of activated sludge reactors all connected by conduit pipe or other means, with or without means for flow interruption between the said reactors. The last reactor in each series of reactors is termed the principal reactor from which the biologically treated effluent is directed. It will be apparent to those skilled in the art, that the reactor may be formed as a slope walled lagoon structure, with earthen, concrete stabilised, membrane lined or concrete retaining walls, or as a conventional reinforced concrete walled vessel or as a structural steel vessel. While some shapes, and dimensioning ratios of the basins may be preferred it is important to state that any geometrically shaped vessel (square, rectangular, circular) can be operated in accordance with this invention specification.

It is well known by those experienced in the art that a number of reaction conditions need to be satisfied in order to achieve biological nitrification—denitrification and enhanced biological phosphorus removal. In particular the nitrification reaction requires an adequate supply of inorganic carbon. The removal of phosphorus by biological means requires selectivity reaction circumstances to cause the necessary micro-organisms to proliferate. Among chose requirements is a substrate preferably containing volatile fatty acids and more commonly referred to as readily degradable soluble substrate. Additionally required are reaction conditions that cycle between the so called description of toxic and anaerobic. It is necessary to be more definitive when using these terms as there are degrees of anaerobicity which trigger certain biological reactions. An absence of oxygen and nitrite—nitrate is in current terminology not sufficient to describe "anaerobic" to the extent that biological phosphorus removal will take place. Anaerobic reaction conditions require a more exacting definition when applied to phased activated sludge processing whereby oxic, anoxic and anaerobic reaction conditions can be induced on a single sludge culture by relatively simple manipulation of fill and aeration sequencing. Selectivity pressures are dominated by exposure of the culture to high acetate—substrate loading pressures under sequenced anaerobic, anoxic and oxic reaction conditions. An absence of nitrate and dissolved oxygen concentration is not sufficient to define anaerobic conditions which will cause the relevant micro-organisms species to release its content of Poly P. According to conventional knowledge it is usual to describe appropriate reaction conditions in terms of a bulk liquid oxidation reduction potential (a value of EMF referenced to a standard electrode measurement of hydrogen or silver chloride). Hence this value needs to be sufficiently negative (−150 mV, Hydrogen electrode reference) to ensure a degree of definable anaerobicity to ensure the phosphate release mechanism. It has been found that the ORP depletion rate from positive (oxidizing) conditions to negative (reducing) conditions is functional on the metabolic activity of the biomass at the switching oxidation reduction potential. The same metabolic activity is a function of the amount of residual intracellular storage compounds maintained in the culture. Using this description, a biomass having a high value of oxygen uptake rate in an oxidation environment will rapidly approach more negative ORP values when the oxidizing reactant (oxygen) is removed. A biomass having a lower value of oxygen uptake rate will consequently deplete its ORP at a slower rate. Biological phosphorus release occurs at a value some 250 mV more positive than the values that equate to the reduction of sulfide. In the practice of the art, using other conventional constant volume processing, it has been necessary to define hydraulic retention time criteria as a means of ensuring appropriate reaction conditions. Through research and trial and error, a range of parameters has been found, relating to process and simply described in terms of the actual oxygen uptake rate of the single sludge biomass that can be used to specify the reaction conditions that ensure a reliable and continued desirable process result. The application of these control parameters to the operation of the preferred embodiment provides an overall process that is less expensive than the generally accepted conventional methodology and one which is much less complex to operate. The principal parameter relates to an overall activity level of the biomass as measured by its oxygen utilisation rate (OUR) and its potential oxygen utilisation rate (POUR). Process control using these parameters enables the use of set point values which obtain the reliable removal of pollutants and nutrients and at the same time produce a biomass which has excellent solids—liquid separation properties.

Therefore, it is an aim of the present invention to provide a method and apparatus for treatment of wastes which at least alleviates one or more of the problems of existing methods and apparatus by more closely monitoring process conditions and parameters relating to the activity of the biomass, such as for example oxygen utilisation rates including potential oxygen utilisation rates.

According to the present invention there is provided a method of treating waste by controlling metabolic activity of micro-organisms of a biomass containing the waste so as to remove selected components of the waste prior to disposal of treated waste, characterized in that the method comprises monitoring at least one oxygen utilisation rate of the biomass in order to determine a requisite amount of oxygen to be supplied to the biomass and monitoring a period of aeration of the biomass by the oxygen so as to maintain a predetermined oxygen utilisation rate or value to achieve removal of the components.

One aspect of the present invention relates to the sizing of the activated sludge reactor(s), their mode of operation and the automatic optimisation of the amount of oxygen supplied to the reactor(s) in terms of rate and time of application by sensing the metabolic activity of the biomass in the principal reactor. This metabolic activity is sensed as the actual oxygen utilisation rate of the biomass in the principal reactor near to the and or at the end of an air-on sequence. Upon interruption of the supply of air to the principal reactor, the contents therein remain in motion for up to ten minutes, the natural mixing motion increasingly decreases with time. Values of dissolved oxygen concentration are sensed and monitored at intervals of ten or twenty seconds. A minimum of ten points are taken and mathematically treated to provide a slope of best fit which best describes the initial dissolved oxygen depletion rate and hence a nominal actual oxygen utilization rate. These data are trend plotted with cycle volume, the volumetric load, pertaining to the activity measurement plus the maximum dissolved oxygen concentration sensed during the cycle. The sensed dissolved oxygen concentration and blower speed profile is also recorded. The invention relates to the maintenance of a biomass (mixed culture of micro-organisms), through optimal oxygen input, having a selectable optimal biological activity as measured by its oxygen utilisation rate, volatile suspended solids fraction and degradable volatile suspended solids fraction as later defined. The dissolved oxygen sensor measures the in-situ biomass oxygen utilisation rate for use in controlling and regulating the input of oxygen from the air input device pump or compressor. As described with reference to the preferred embodiments, reaction conditions in this principal reactor variously sequence from air-on to air-off. An air-on sequence will typically be continuous and occurs while influent wastewater is introduced into the basin(s) then stops during which time the biomass in the principal treatment reactor settles after which supernatant clear liquid is removed from the principal process reactor. The invention operates similarly with non-continuous air on sequencing. When the effluent removal sequence is completed air and untreated wastewater is again introduced into the principal process reactor until the air sequence is again stopped. A total cycle of operation can typically be four hours, an aeration sequence will typically be two hours; other time combinations can be used. To those skilled in the art it can be easily seen that other time increments may be used. Two measurements are made. The rate of depletion of dissolved oxygen during the initial minutes after the cessation of aeration. Other intermediate rates associated with multiple aeration sequencing can also be read. A second rate is measured when the air is again turned on during which time a maxaimum flow rate of air is introduced into the reactor or a section of the reactor for a set time (this in a variable which needs to be set for each plant and be subject of relatively infrequent adjustment through a check calibration procedure. The rate of change of dissolved oxygen $(dO_2)/dt$ increase and depletion, and the manner in which the biomass settles $d(MLSS)/dt$ are related where $O_2$ refers to concentration of dissolved oxygen and (MLSS) refers to simple concentration of activated sludge. Both vary with time when the introduction of air to the basin is stopped. Similarly there is a time variation of both parameters during the initial period of an aeration sequence. In the preferred embodiment the principle reactor of the system is configured with diffuser grids and feed lines to provide more than one effective mixed reaction zone upon introduction of air. A minimum of one section of the principal reactor will typically be aerated at the start of an aeration sequence. Biomass from this initial aerated mixed zone is used to determine the rate of change of oxygen increase at the start of an aeration sequence. In the preferred embodiment it is possible to time select the various grid zones for aeration. In those embodiments that have a single grid assembly, the same results will be obtained through aeration of the total principal reactor volume.

A part of the invention lies in the in-basin measurement of oxygen utilisation rate in order to provide the requisite oxygen in terms of rate of supply and period of aeration, to maintain a set point oxygen utilisation rate. This in turn sets the reaction conditions for the processing of wastewater using fed-batch single sludge single reactor technology. Measurement and control is but one part of the invention. The reactor basin processing, as described by the preferred embodiment, is closely associated with the measurement aspect. Both are cognated in the present invention. It will be understood by those experienced in the art that aeration of the principal reactor for too long, in successive sequences, will quickly lead to a loss of metabolic activity of the biomass therein and a subsequent inability of that biomass to properly denitrify and to take part in the removal of phosphorus by biological mass. Over aeration of the biomass will also lead to a reduced floc aggregation and hence an undesirable increase in effluent suspended solids concentration. Continued operation outside of the desired sludge age envelope will lead to a similar consequence. Biomass oxygen utilization rate measurement is used to fix the envelope of operating sludge age.

The present invention will now be described by way of example with reference to the accompanying drawings in which:

FIG. 4 is a plot of biorate feed-starve set point operation;

FIG. 5 is a schematic diagram showing definitive conditions of oxic, anoxic and anaerobic reaction conditions expressed in terms of bulk phase measured oxidation reduction potential;

FIGS. 6(a) to 6(g) are schematic views of alternative forms of the reactor showing different configurations for feed inputs and effluent outlets, including multi-split inputs and outlets.

While it will be realised by those experienced in the art, that the reaction embodiment can take a number of forms, a simple embodiment for the purposes of instruction will now be described.

Figure 1:
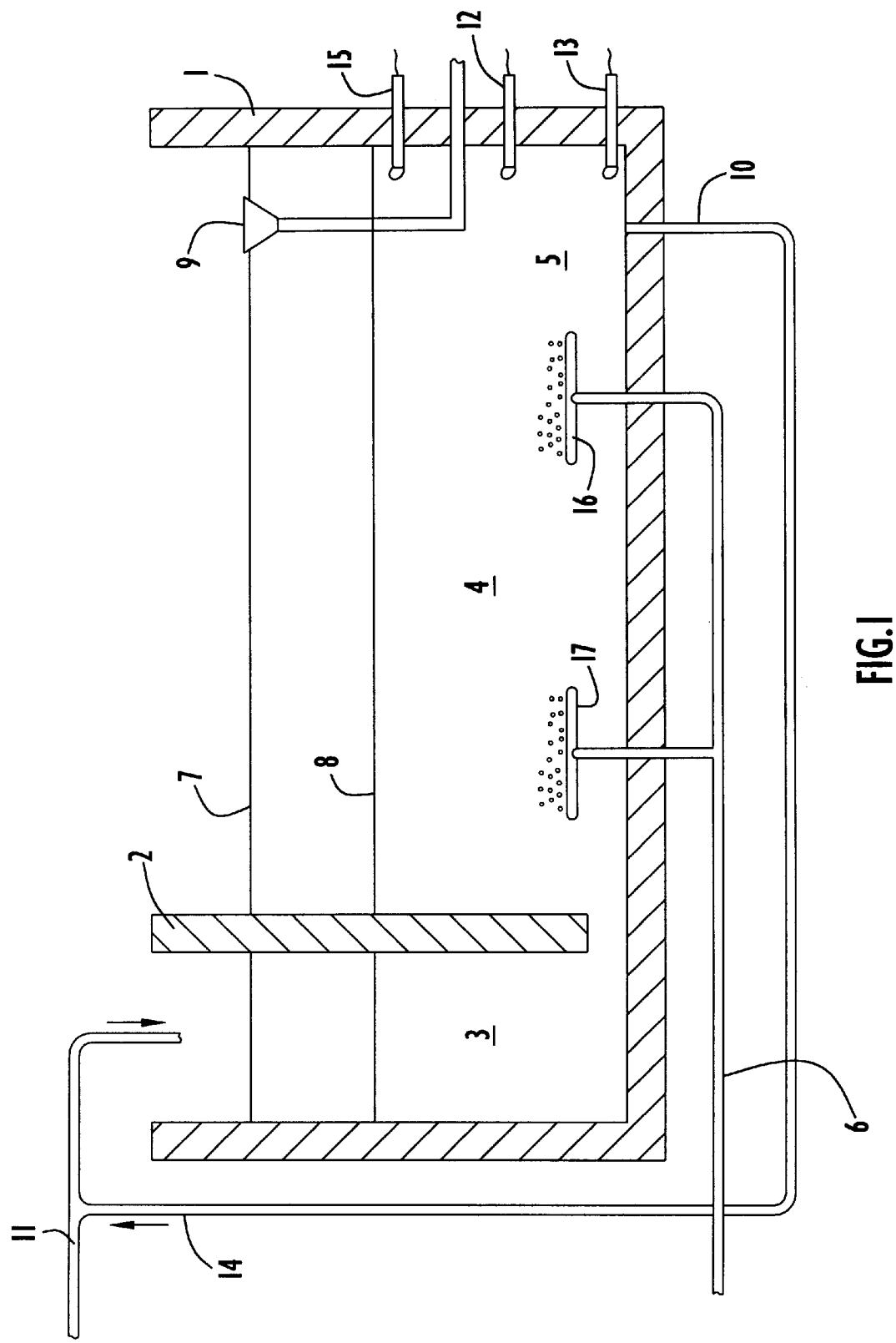
FIG. 1 is a schematic view of one form of the reactor of the present invent-ion having a single reactor divided into two compartments.

In FIG. 1 is shown schematically one form of a single basin reactor of the present invention. The boundary of the reactor basin shown in FIG. 1 is shown in elevation and is depicted as (1) being of solid construction and designed to contain water. A minimum of two reactor zones, shown as (3) and (4) caused by a sub compartment, partial wall, baffle wall or the like (shown as (2)), is depicted. The reactor zones are in fluid communication by pipe or other conduit or by a section of open area formed by the partial baffle wall. Means for diffusing air for the reactive oxygen component, preferably by a grid of membrane diffusers, is shown as (5) receiving a flow of compressed air from a mechanical engine shown as (6). A means for transferring the contents of (4), the principal reactor, using a regulating transfer pump to come in contact with the influent flow (designated (11)) and for its admixture and reaction in (3) is shown. Two important levels are shown in the reactor basin, that of (8), the designated bottom water level and that of (9), the designated top water level. In this embodiment a sequence of aeration takes place while flows designated (10) and (11) take place, i.e. filling from bottom water levels (8) to top water level (9). When this sequence is complete, the means of aeration are interrupted to stop the mixing and oxygen transfer procedure thus allowing the mixed solids to settle and separate to form an overlaying supernatant clear layer of liquid on top of a layer of settled solids. At an appropriate tine the decanter (9) is caused to function and to remove the volumetric depth between (8) and (9), after which its functionality ceases until the end of the next cycle. In this embodiment in flow (11) may be continuous or intermittent; outflow through the operation of the decanter (9) is necessarily discontinuous relative to the total time span of the cycle that permits the operation of inflow and aeration, settle and decant. The placement of a dissolved oxygen sensor (12) either within the principal reactor (4) or within the pumped line feeding biomass from the principal reactor for admixture of influent (11) within the initial reaction zone (3), is marked 14. An instrument that can be used for monitoring the in-basin concentration of the biomass (mixed liquor suspended solids) shown as (13) may be used in the preferred embodiment. A sludge blanket interface detector (15) is also useful for automatic sludge wasting operation from the preferred embodiment. Two floor mounted diffuser grid assemblies are shown; (16) and (17) schematically show means for selectively using a grid assembly which is constituted by more than two downcomer—valve attachments. It will be seen by those that are experienced in the art that a principal reactor basin may have many more than two downcomer valve attachments, depending upon the total area of the reactor basin and the effective area of influence of the means for diffusion mixing and oxygen transfer. Reactor embodiments provide for selective and sequenced area aeration or for total area aeration.

Figure 2:
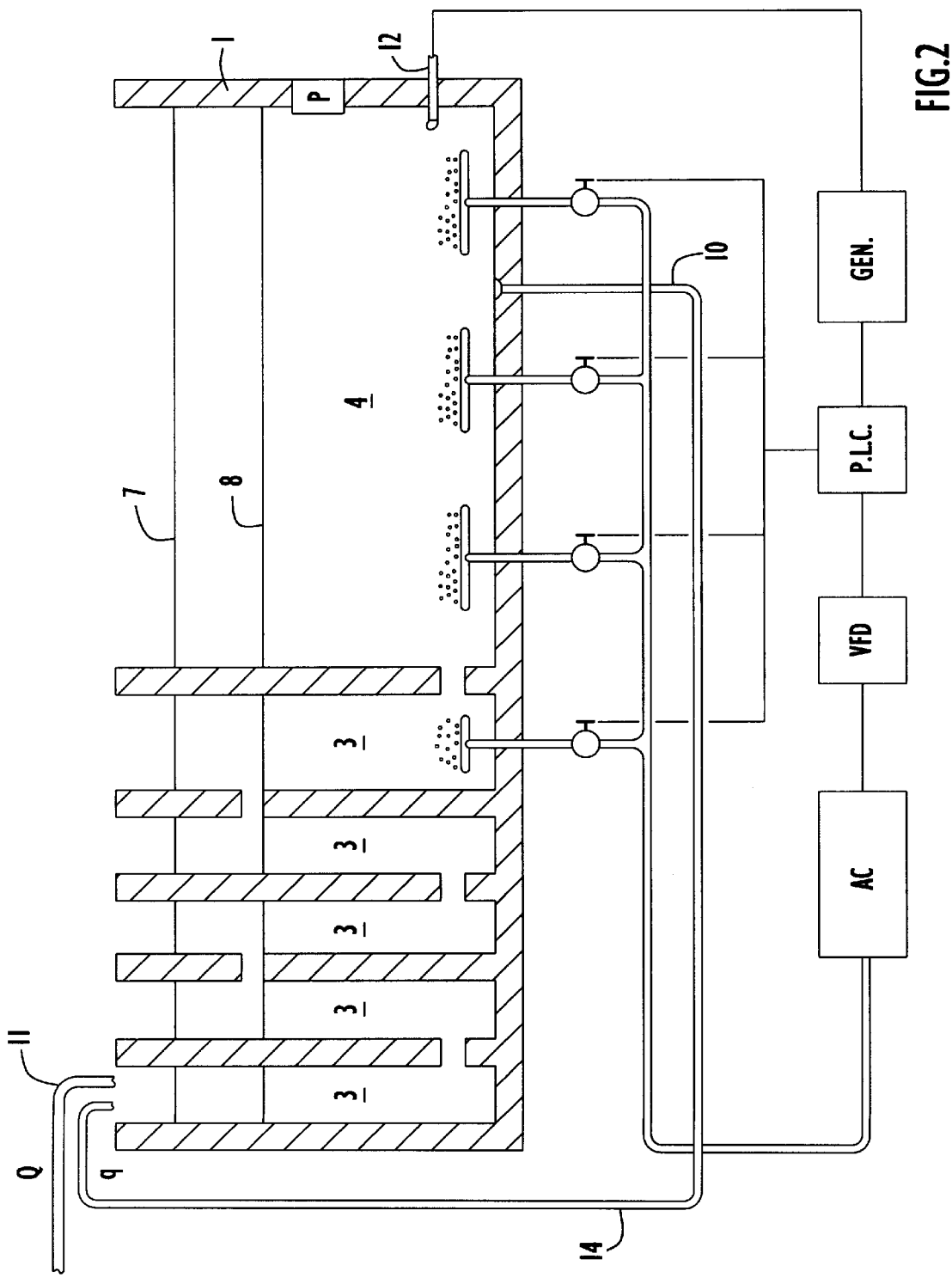
FIG. 2 is a schematic view of another form of the reactor of the present invention being a single basin configuration having a main reactor and separate auxiliary reactors.

The embodiment of the reactor(s) of the present invention shown in FIG. 2 has similar components to the reactor of FIG. 1 and accordingly the same reference numerals are used to identify similar features of the reactor(s).

The present invention relates to wastewater treatment methodology and means of controlling the overall metabolic activity of dispersed growth micro-organisms within a single sludge mass to achieve the beneficial result of reliable simultaneous carbonaceous removal, as measured by COD, BOD, TOC, nitrogen removal, as measured by TKN, $NH_3$—N, $NO_2$—N, $NO_3$—N, and phosphorus removal, as measured by $PO_4$, from a wastewater and within the time frame of a repetitive cycling of process events. The invention relates to means of measuring in-basin oxygen utilisation rate and manipulating aeration input to maintain a set point regime of reaction conditions that will permit single sludge single basin treatment for carbon removal and/or nitrogen removal and/or-enhanced biological phosphorus removal. These reaction conditions are dependent upon a set point oxygen utilisation rate as it deternines the viability of the microbial population at the set operating sludge age and is deterministic on the not settling properties of the single sludge. Wastewater may be essentially domestic or industrial or a mixture of both types.

industrial wastewater is described as a discrete classification to differentiate from total household wastewaters which essentially comprise human wastes (faeces, urine), body washing wastewater, clothes washing wastewater and food preparation wastewater. Industrial wastewaters are essentially those wastewaters that are generated in the manufacture of products and in particular are wastewaters that are biodegradable. State-of-the-art technologies using dispersed growth micro-biological reactions have been well described in the literature, for example:

Quirk T., Eckenfelder W. W., and Coronszy M. C., "Activated Sludge; State-of-the-Art". Critical Reviews in Environmental Control, CRC Press Vol. 15, Issue 2, 1985.

Eckenfolder W. Wesley, Jr. "Industrial Wastewater Treatment" McGraw Hill, 1991.

Eckenfelder W. Wesley, Jr. "Principles of Water Quality Management" C.B.I. Publishing Company, Inc., 1980.

Without limiting the coverage of the invention, reference is made to fractional components of a wastewater; the relative factions may be different in domestic and industrial wastewaters. It is important to recognize that those fractions exist and their relative magnitude can impact upon the methodology of using the invention and the process configuration in which that invention is embodied.

It is important to recognise that wastewaters typically comprise soluble and insoluble components which include readily degradable soluble organics, degradable soluble organics that are not as rapidly degradable, non degradable soluble organics, readily hydrolysable and degradable particulate substrates, slowly degradable particulate and non degradable particulate substrates. These substrates, their relative concentrations and their relative concentrations to other components such as TKN, $NH_3$—N, $NO_3$—N, total P and ortho P may have a large influence on the rate and generation of certain dispersed growth micro-organism species.

Goronazy M. C. and Eckenfelder, W. W., "The rate of the degradation of primary solids in activated sludge plants" Proceedings Water Pollution Control Federation Conference, Toronto, Canada. October 1991.

Dispersed growth wastewater treatment methodology typically involves oxic, anoxic and anaerobic reaction environments and mechanisms through which energy transformations take place involving electron acceptors to generate a net reduction in concentration of organic compounds as measured by BOD, COD, TOC and nitrogen and phosphorus (FIG. 5).

These regimes of processing can be generally described in part through the concentration of dissolved oxygen, nitrite and nitrate nitrogen, sulphate, phosphate and in part through the scale of oxidation reduction potential (ORP) relative to the standard hydrogen electrode. Positive values of ORP typically relate to oxidative conditions while negative values of ORP typically relate to reducing conditions. There is no defined relationship between ORP and dissolved oxygen concentration on the positive scale, although the input of oxygen as a chemical source of oxygen will cause a response in ORP to be less negative or more positive. Temperature can influence the relative value of ORP as can the presence and relative density of micro-organism species. Essentially the removal of carbon compounds and TKN compounds requires aerobic conditions, the removal of NO3-N, and N2-N requires anoxic to anaerobic conditions and the removal of P requires oxic-anoxic and anaerobic conditions with cyclic exposure of the biomass, or specified fractions of the biomass in the aeration basin, to achieve ORP reaction environments that vary between circa 50 mV to −150 mV (hydrogen electrode reference) to enable all of the processing reactions to take place. The understanding of the actual discrete mechanisms, while being important to treatment results is not important to the description of the preferred embodiment of the invention herein.

Suffice to say there are reaction regimes herein which provide an envelope of performance which is necessarily required to permit the single sludge removal of the herein beforementioned parameters. Typical domestic wastewaters are described by 24 hour flow weighted composite samples in which the measured parameters of total COD, TKN, Phosphorus are up to 1000 $mgL^{-1}$, 85 $mgL^{-1}$ and 15 $mgL^{-1}$ etc.

TABLE 1

Concentrations of Selected Constituents in Municipal Wastewaters

| Constituent | Concentration (mg/L) related to wastewater strength | | |
|---|---|---|---|
| | Strong | Medium | Weak |
| (a) BOD | 400 | 220 | 110 |
| (b) COD | 1000 | 500 | 250 |
| (c) SS | 350 | 220 | 100 |
| (d) Nitrogen | | | |
| Total | 85 | 40 | 20 |
| Organic | 35 | 15 | 8 |

TABLE 1-continued

Concentrations of Selected Constituents in Municipal Wastewaters

| Constituent | Concentration (mg/L) related to wastewater strength | | |
|---|---|---|---|
| | Strong | Medium | Weak |
| Ammonia | 50 | 25 | 12 |
| Nitrite | 0 | 0 | 0 |
| Nitrate | 0 | 0 | 0 |
| (e) Phosphorus | | | |
| Total | 15 | 8 | 4 |
| Organic | 5 | 3 | 1 |
| Inorganic | 10 | 5 | 3 |
| (f) Alkalinity (as $CACO_3$) | 150 | 100 | 50 |

The relative amounts of carbon, nitrogen and phosphorus indicated by literature values in Table 1 differ considerably from those required for normal biological growth as reflected in the proportion of carbon and nitrogen given by the empirical analysis for cell material —$C_5H_7NO_2$— together with the fact that cells contain around 1 to 2% of phosphorus by mass. That is, carbon is present in short supply relative to nitrogen and phosphorus in raw sewage as illustrated by Table 2. This shortage is worse for settled sewage and is further compounded by the fact that about 50% of the organic carbon is oxidised to $CO_2$ in biological treatment.

The nitrogen and phosphorus in excess of biological requirements normally remain in the biological treatment plant effluent. The form in which these nutrients are present in the effluent may differ markedly from that in the influent.

Nitrogen is present in raw sewage mainly as organic nitrogen and ammonia, much of which results from hydrolysis of urea, a major constituent of urine. in biological treatment some of this nitrogen is incorporated into new cell growth and is removed as biological sludge while most of the remaining nitrogen may be either in the form of ammonia or, depending upon conditions in the plant, as the oxidised form, nitrate, and to a lesser extent nitrite. Some organic nitrogen also remains in the effluent, mainly in association with the effluent suspended solids.

TABLE 2

Nutrient Imbalance in Municipal Wastewaters for Medium Strength Wastewater

| Constituent | Relative Nutrient Proportions | | |
|---|---|---|---|
| | Carbon (mg/L) | Nitrogen (mg/L) | Phosphorus (mg/L) |
| Typical Biomass ($C_5H_7NO_2$, & p = $^N/_5$) | 60 | 14 | 2.8 |
| Wastewater | BOD5 = 220 $BOD_{ult}$ = 323 c = 120 | $NH_4$ − N = 25 Org. − N = 15 Total N = 40 | 10 |
| Uptake in CELL GROWTH (Net Yield = 0.5) | 60 | 14 | 2.8 |

TABLE 2-continued

Nutrient Imbalance in Municipal Wastewaters for Medium Strength Wastewater

| Constituent | Relative Nutrient Proportions | | |
|---|---|---|---|
| | Carbon (mg/L) | Nitrogen (mg/L) | Phosphorus (mg/L) |
| gcellC / GwasteC Residual Effluent Concentration (mg/L) | — | 26 | 7.2 |
| Overall Removal (96) | 100% | 35% | 28% |

Phosphorus is present in raw sewage in two major forms—organic and inorganic. There are in fact many forms of phosphorus compounds in raw wastewaters, either in solution or in suspension. Inorganic dissolved forms consist mainly of orthophosphates and condensed phosphates while the dissolved organic forms are organic orthophosphates.

Figure 3:
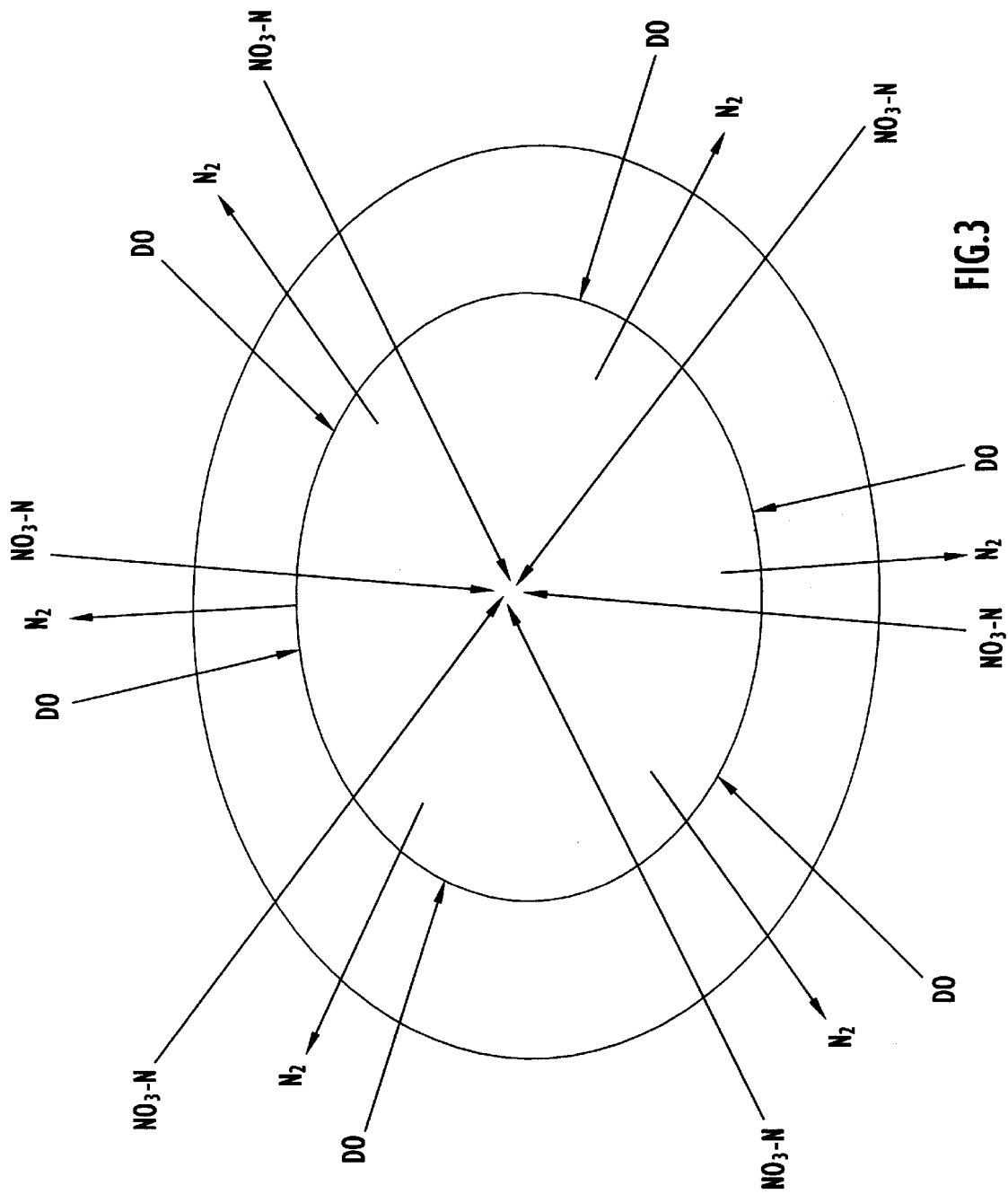
FIG. 3 is a schematic view of one form of an intra floc anoxic-denitrification model used in the present invention.
Figure 6A:
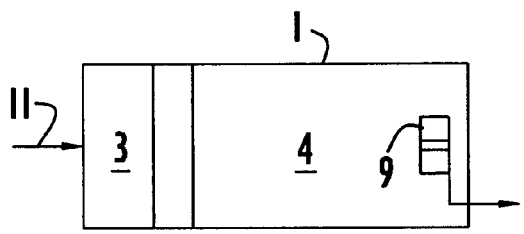
Figure 6B:
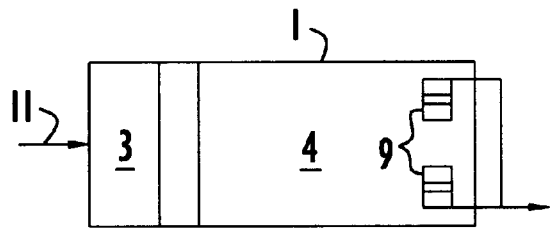
Figure 6C:
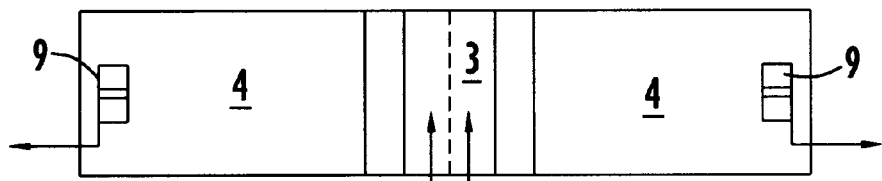
Figure 6D:
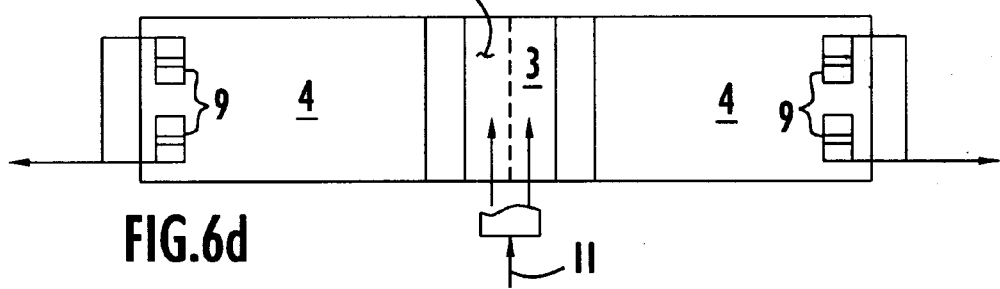
Figure 6E:
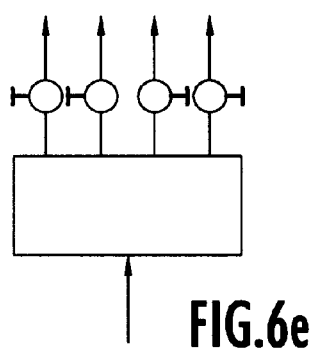
Figure 6F:
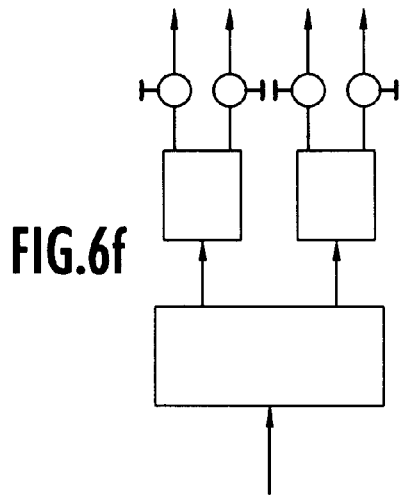

One of the specific mechanisms concerns reaction conditions which maximise the initial rate of removal and storage of the readily degradable soluble fraction of the influent wastewater flow entering the treatment plant. The treatment plant is herein described as means to receive said wastewater, means of contacting the influent flow of wastewater with the manufactured active micro-organisms, means to contain said wastewater in contact with the degrading micro-organisms to effect the envelope of performance and means for separating the said treated wastewater from the degrading and remaining micro-organisms. The envelope of performance concerns the manufacture or presence of a sufficient concentration of active micro-organisms (Xo) such that intimate contact of these micro-organisms with the influent wastewater readily degradable soluble substrate (So) causes a rapid enzymatic reaction whereby the So is transferred into the bacterial culture with the subsequent generation of PHB, glycogen and/or other intermediate 'storage' compounds within the cell structure of the reactive micro-organisms with a subsequent generation of glycocalyx (a coagulating polysaccharide compound). The transfer of substrate from the liquid phase to the solid phase is energy demanding. Under measurable oxic reaction conditions there is a rapid increase in the rate of demand for using dissolved oxygen (its oxygen utilisation rate). The energy oxygen equivalence can easily be measured by introducing a mass of dissolved oxygen to the biomass, the rate of utilization is measured through simple dissolved oxygen versus time measurements. As the relative magnitude of the ratio So to Xo increases, the peak oxygen utilisation rate increases until a maximum or plateau value is reached. This is the first reaction envelope which also specifies a mass and rate of removal of readily degradable soluble substrates. The rate of utilization of oxygen also parallels the rate of removal of liquid phase soluble substrate and this allows the energy inter-relationship to be formulated (FIG. 3).

The measurement of degradation of a wastewater using an oxygen balance assumes that all oxygen consuming reactions involve a soluble substrate under biological growth reactions.

In a dispersed growth culture, new micro-organisms are formed as other viable cells are lost through endogenous metabolism, lysis and predation. The net active fraction of a bioculture is related to the limiting fraction of non-degradables, sludge age (MCRT) and the loss of cell viability. Reduction in the availability of food (the initial loading condition) or the over (extended) aeration of a culture having limited food availability will effectively cause a loss of microbial viability.

The transfer of dissolved oxygen to the liquid phase for use in meeting the oxygen demand of the combined wastewater and bioculture is very complex. The most important factors that need to be considered include, the water chemistry, the specific geometry and mechanism of the transfer device, basin geometry (width, length, side water depth), power input per unit volume of wetted basin, wetted depth to wetted area of basin, total dissolved solids, residual dissolved oxygen concentration, temperature, surface tension, mean diameter of air bubbles, retention time of air bubbles in liquid medium, oxygen demand of basin contents, air flow rate per oxygen transfer device, ratio of areas of air flow rate device to total basin floor area, area distribution of oxygen transfer devices, altitude, concentration of the bioculture, system sludge age, active fraction of the bioculture, mean particle size of the bioculture, bulk removal rate of dissolved oxygen by the biomass (hereinafter referred to as BIORATE).

Oxygen and its rate of utilisation, for all of the reactions taking place involving the adsorption, absorption of nutrients, their metabolism into biosolids and the subsequent degradation of biomass, is of prime importance. The provision of oxygen at an adequate rate is therefore the key element to the use of cyclic aerobic, facultative and anaerobic micro-biological treatment methodology for the net rate of removal of nutrients by oxidative and reductive means, for the net rate of accumulation of biosolids and for the net removal of phosphates by biological means. The rate of supply of oxygen, its net residual concentration and the BIORATE, relative to the So/Xo distribution generally determines net growth factors for different groups of micro-organisms generally described as predominantly floc-forming or as filamentous forms. An overgrowth of filamentous forms is counterproductive to the treatment goals as this condition causes a disruption of the processing time scale for solids—liquid separation. it is therefore mandatory that biological growth associated with predominantly floc-forming micro-organisms. The cognation of the preferred process embodiment and the means for biomass process control based on oxygen utilisation rate set-points are directed to this objective.

The removal of nutrients by each of the mechanisms of adsorption, biosorption, oxidation and assimilation with ultimate aerobic destruction of biological solids requires different oxygen fractions. The net use of oxygen is directly related to the proportion of nutrient removal by each mechanism.

BIGRATE is a function of the condition of the biomass and the nature of the soluble substrate in contact with the biomass. A single sludge system can be made to exhibit a maximum biorate and a minimum biorate depending on aeration time and the initial ratio of So/Xo. The active fraction of the biomass influences the range of biorate that its biomass will exhibit.

Data taken from a 5 series complete-mix, constant volume reactor system is presented to demonstrate typical magnitudes and changes that take place.

TABLE 3

Biorate and Associated Parameters

| So/Xo mg mg$^{-1}$ | MCRT d | Biorate I mg O$_2$gvsshr$^{-1}$ |
|---|---|---|
| 4.0 | 1 | 147 |
| 1.0 | 2 | 90 |
| 0.5 | 3 | 66 |
| 0.25 | 8 | 56 |
| 0.21 | 15 | 43 |
| 0.21 | 40 | 35 |

For these rates the initial reactor operated with a 70 minute residence time and the total reactor 420 minutes residence time.

TABLE 4

So/Xo vs Biorate (mg O$_2$ g$^{-1}$ VSS h$^{-1}$)

| So/Xo | 0.056 | 0.062 | 0.113 | 0.182 | 0.197 | 0.388 | 0.437 | 1.00 | 4.0 |
|---|---|---|---|---|---|---|---|---|---|
| Biorate | 35.2 | 33.1 | 43.1 | 57.9 | 56.3 | 74.4 | 70.4 | 90.0 | 147 |

Instantaneous oxygen utilisation rate can be typically measured by a bench scale method in which the time concentration measurement of dissolved oxygen depletion of an oxygenated sample of activated sludge removed from the process reactor is measured. This is a simple batch test which requires a sample to be taken from the activated sludge reaction basin, aerated, placed in a mixed reactor into which is placed a dissolved oxygen measuring sensor; ingress of air is prevented. When the dissolved oxygen meter senses oxygen depletion is taking place, measurements of dissolved oxygen versus tine are taken.

Respirometry control as it is currently practised in activated Sludge processing is complex and indirect. Respiration rates are measured with a meter which typically consists of a closed completely mixed respiration chamber through which activated sludge from the reacting aeration tank is continuously pumped. Dissolved oxygen concentration is periodically measured with an oxygen sensor at the inlet as well as at the outlet of the respiration chabber which can be achieved by altering the flow direction using a system of valves (as one method).

The problem with measuring the oxygen content at the inlet and outlet of the respiration chamber is that the oxygen content within the respiration chamber varies significantly from the oxygen content at the inlet and outlet of the chamber thus giving erroneous measurement.

The aim of this present invention is to provide a wastewater plant treatment and a method of treating wastewater wherein the metabolic activity of the biomass is maintained at a level to ensure a maximum rate of biological removal of nutrients by oxidative and reductive means through the measurement of BIORATE as previously specified within the principal reaction basin through measurements that occur by the sensing of oxygen concentration response changes at the end of an aeration sequence.

The wastewater treatment plant of the present invention comprises a principal reactor means capable of maintaining wastewater in contact with biologically active degrading micro-organisms, a receiving means to receive wastewater into the reactor means, an oxygen transfer means whereby air is introduced into the principal reactor, a control means for operating the said sequences and necessary equipment, an oxygen detection means to detect the relative changes in dissolved oxygen present in the principal reactor means and a control means to control the amount of oxygen introduced into the principal reactor means so that the activity of the micro-organisms is not limited by the amount of oxygen present in the principal reactor wherein the oxygen detection is within the principal reactor means.

Measured in the biomass according to the present invention there is provided an apparatus or a process using dispersed growth biological cultures for the treatment of wastewater which comprises the following in combination with each other:

A means for maintaining a maximum potential BIORATE in an initial designated unaerated reaction zone for the culture through the defined admixture of influent wastewater and biomass from the principal and final designated reaction zone, a means for introducing dissolved oxygen into the specified principal reaction zone(s) for operation under preselected area and pre-programmed aeration sequences, a means for interrupting the influent wastewater to the initial designated reaction zone, a means for removing a fraction of the supernatant clear treated wastewater after a set sequence of non-aeration, a means for detecting and measuring the position of the biosludge interface layer, a means for interacting the biosolids interface with the biosludge wasting program with the detection of the biosludge interface position, a means for setting automatic time sequences for automatic operations, a means for operation of the principal final designated reaction volume as a variable volume complete-mix unit, a means for measuring the biorate in the principal final designated reaction volume using a dissolved oxygen sensor properly placed in that basin volume, a means for measuring the rate of change of dissolved oxygen concentration and making comparison with the actual respiration rate to control the rate of introduction of dissolved oxygen into the treatment system, a means of operation for maximising the ratio of potential oxygen utilization rate (determined through defined ad mixture of influent and biomass from the principal reactor) to oxygen utilisation rate in the principal reactor, a means for automatically setting the duration of the aeration sequence as measured and calculated by the actual respiration rate, a means for optimising the use of aeration power to effect nitrification and denitrification, a means of operating the system through BIORATE control to effect maximum biological phosphorus removal, a means for operating the process so that the principal final designated aeration volume operates at an approximate biological steady state actual respiration rate (corrected for active fraction of biomass), a means for using the dissolved oxygen depletion rate that results from interrupting the air flow to the basin and a biomass concentration settling algorithm to provide the BIORATE parameter, a means for removing near surface supernatant liquor at from about 20 cm below the liquid surface at a constant rate to equivalent liquid depths up to two metres in a preferred 5–6 metre basin depth wherein the reactor configurations permit end basin or across basin centre feed location, and the reactor configurations permit transverse or longitudinal location of effluent decanting devices, whereby the apparatus and process is used to treat wastewater.

The wastewater treatment plant may consist of one or more reactors and a minimum of one principal reactor. In a preferred embodiment, the wastewater treatment plant consists of at least two reactors in fluid communication means. In one embodiment the plant consists of several reactors in fluid communication wherein different components such as nitrogen, phosphorus, carbon and the like are together accumulatively removed in different reactors. In a further embodiment the oxygen content in each reactor is significantly different.

In a particularly preferred embodiment the wastewater treatment plant comprises at least two reactors, a first reactor with multiple zones, typically unaerated whereby absorption and biological phosphorus release mechanisms take place, a second reactor which operates through cyclical oxic—anoxic—anaerobic conditions for the microbial degradation of carbon compounds and TKN compounds in a wastewater and for the microbial removal of $NO_3$—N, $No_2$—N and the microbial removal of P in the wastewaters; both reactors are in fluid communication.

In a further embodiment the waste treatment plant comprises one principal reactor and the conditions within the reactor are adjusted cyclically so that the conditions vary from aerobic to anoxic to anaerobic and are repeated using definitions described previously.

The oxygen detection means may be any suitable means for detecting dissolved oxygen. Preferably the oxygen detection means detects dissolved oxygen. More preferably, the oxygen detection means is an electronic oxygen sensor able to measure the rate of change of dissolved oxygen concentration as a 4–20 milliamp primary control signal through the use of a computer and other programmable logic controller through which output signals are generated which allow interactive control of the rate of introduction of air into the reactor according to a set concentration profile. More preferably the oxygen concentration is sensed as a result of aeration of the wastewater/microbial mix in the principal reactor.

The oxygen concentration is typically adjusted during water treatment. Preferably the concentration of oxygen in the wastewater/microbial mix is adjusted during an aeration sequence. In particular, the concentration of oxygen present is controlled by adjusting the duration of the aeration sequence and/or adjusting the flow of air in the aeration sequence. The flow of air may be controlled by a speed control mechanism on the generator of the air supply flow or in the flow of air through a position control mechanism of a suitable control valve or other means that are specific to the oxygen input device. Control of the air flow by either means results in the control of the mass rate of transfer of dissolved oxygen to the principal reactor.

The oxygen sensor is preferably located within the principal reactor itself. The oxygen sensor is located within the wastewater/microbial mix. More preferably the oxygen sensor is located around 30 cm away from any surface of the principal reactor floor. Alternatively, the sensor can be located in a pipe through which biomass from the principal reactor is pumped.

In one embodiment of the present invention the oxygen sensor calculates the actual in basin oxygen uptake based on the sum of the endogenous or basic oxygen uptake and the oxygen uptake rate for oxidation of readily biodegradable substrates, such as substrates in the carbon and nitrogen form, depending upon the micro-organisms that are present and the operating sludge age of the system taking into account altitude and temperature.

Experimental work has shown a relationship to exist between the ratio of potential oxygen utilisation rate and sludge settleability, provided dissolved oxygen concentration is not limiting. A further relationship exists relative to the value of actual oxygen utilisation rate and the rate of depletion of oxidation reduction potential. The value of actual oxygen utilization rate, over and above the endogenous oxygen utilisation rate also relates to a quantification of the mass of stored readily degradable soluble substrate remaining in the biomass and the capability of that biomass to participate in quantitative enhanced biological phosphorus removal mechanisms. An embodiment of the invention is to provide means of maintaining a mass transfer of oxygen (through aeration) which approximately equates to the biomass oxygen demand and by such means cause the aerobic degradation mechanisms to take place at an optimal use of oxygen transfer energy. Automatic means are provided for setting the length of the aeration sequence, the mass of micro-organisms to be carried in the principal reactor, setting the desirable dissolved oxygen concentration profile in accordance with the resultant set-point oxygen utilisation rate measured at the end of the aeration sequence and the magnitude of the POUR/OUR ratio.

That the embodiment of the invention is such as to cause co-current nitrification-denitrification to essentially practical completion and to provide for biologically enhanced phosphorus removal mechanisms that are well known to those experienced in the art.

In one embodiment there is one or more reactors the first receives an in fluid communication one of which is admixture of wastewater and micro-organisms contained in the mixed liquor from the last reactor.

In a preferred embodiment the invention relates to the use of a fed-batch reactor volume which is essentially operated as a completely mixed reactor during an aerated sequence, albeit of variable volume, during which time a combined flow of influent domestic wastewater and a flow of mixed liquor solids from the fed-batch reactor volume is introduced.

Even more preferably, a wastewater/microbial mix goes through a complete aeration cycle. The same mix then undergoes a non-aeration cycle, during which time a solids layer and an upper supernatant layer segregate. The sequence of events are completed through the removal of a fraction of the upper supernatant layer from the principal reactor using decanting means. The whole cycle is then repeated.

Control and measurement of the respirometric capacity of the biomass directly in the principal reactor is made possible through the complete-mix air-on and air-off operation that takes place in the preferred variable volume activated sludge treatment methodology. It is also possible to check the progress of treatment in an aerated reaction sequence through interruption of the air flow and subsequent measurement of the dissolved oxygen depletion rate.

Measurement of the end of sequence oxygen utilisation rate, combined with the comparison of received process volume (versus minimum set-point volumes) provides the basis for automatic in sequence aeration cycle adjustment which effectively increases the organic loading and hence oxygen utilisation rate as an assurance for biological phosphorus uptake, following its release during otherwise unfavourable uptake reaction conditions.

state-of-the-art on line respirometry as typically applied measures dissolved oxygen concentration in the outlet of a respirometer chamber separate from the principal activated sludge reactor, which is equal to the dissolved oxygen concentration in the respiration chamber and should not be rate limiting. If necessary the activated sludge should be aerated before it enters the respiration chamber. The respiration rate is typically measured every minute from the mass balance of dissolved oxygen over the separate respiration chamber. The actual respiration rate is defined as the oxygen uptake rate in the principal aeration tank. To measure this rate, activated sludge from the principal aerated reactor is continuously pumped into the on line separate respiration chamber which is equal to the mean actual respiration rate in the principal activated sludge reactor basin provided that the sludge loading in the respiration chamber equals the loading in the aeration tank. To maintain loading equivalence influent is continuously added to the sludge flowing into the respiration chainber in the proportion.

Qsam=Qin Vres/Vat
Qsam=influent sample flow to respiration chamber.
Qin=influent flow
Vres=volume respiration chamber
Vat=volume aeration tank In all cases on-line respirometry is measured in a scaled down version of the organic loading conditions that exist in the main aerated reactor of an activated sludge plant. A number of simple respiration rates are so identified; the endogenous respiration rate which is typically defined as the oxygen uptake rate of activate sludge that has been aerated for 1.5 hours without feeding. The maximum respiration rate is defined as the oxygen uptake rate of activated sludge with an excess of soluble substrate (readily biodegradable matter). This rate is measured when an excess of influent is continuously introduced to the sludge flowing into the respiration chamber. The instantaneous respiration rate is defined as the oxygen uptake rate of activated sludge flowing directly from the completely mixed aeration tank through the respiration chamber. The rate is typically lower than the oxygen uptake rate in the aeration tank the actual respiration rate. The absolute value of the instantaneous respiration rate depends on the detention time in the respiration chamber. The maximum respiration rate of a biomass is also equivalent to its potential oxygen utilisation rate.

The embodiment of the present invention uses actual respirometric rate control from measurements taken within the aeration reactor (the principal reactor), not from an inline separate detection unit as is the current general practice.

The actual respiration rate in the preferred embodiment of the invention is the sum of the endogenous or basic respiration and the uptake rate for oxidation of readily biodegradable substrate, both carbon and nitrogen forms, the latter only occurring if a nitrifying biomass is selectively grown. At maximum respiration rate the activated sludge will be in an overloaded condition and will result in incomplete removal of readily biodegradable substrate. This means there is a critical respiration rate in between maximum and basic respiration rate and at this rate the effluent quality meets the requirements and the removal of readily biodegradable substrate, among other parameters is satisfactory. At no time should the oxygenation capacity be rate limiting. It is necessary that the kinetic processes that utilise dissolved oxygen be complete to within the reaction time that is provided for the completion of those reactions. In the case of nitrifying mechanisms, the transferred oxygen required by the oxygen demand must be satisfied by the oxygen supply—time relationship indicated and provided by the respiratory measurement. It is necessary to initially determine by manual means, loading rates, actual respiration rates and dissolved oxygen concentration. There is an advantage when the actual respiration rate is always equal to or near to the critical actual respiration rate. In this case the activated sludge is never overloaded and works at a maximum acceptable rate. Therefore the total amount of activated sludge maintained in the system is optimal and the metabolic activity of the biomass can be maintained at acceptable values to assist with other nutrient removal reactions. An ideal constant actual respiration rate can always be met through manipulation of biomass concentration, aeration time, and rate of supply of oxygen demand.

To those exprienced in the art, there are a number of ways of operating dispersed growth wastewater treatment systems. These generally include the operation of one or more connected reactors, at constant volume at least one of which is aerated continuously, through which the admixture of wastewater and micro-organisms flow. The final basin in these systems is a "quiescent" non-aerated vessel in which solids liquid separation takes place, the clear overflow supernatant being the treated effluent and the underflow solids which are directed to waste and to the reactant vessels. Various internal recycle flows also occur. While the invention can be embodied in this configuration, it is not so limited in its application. In its preferred embodiment the invention relates to the use of a fed-batch reactor volume which is essentially operated as a completely mixed reactor during an aerated sequence, albeit of variable volume, during which time a combined flow of influent wastewater and a flow of mixed liquor solids from that reactor is introduced.

This invention, in its preferred embodiment is specific to reaction conditions that are generated and not necessarily to numbers and zones of the reactor volumes through which the said reactants pass. This is not a limitation on the embodiment. Principally the volume fraction as described as the fed-batch reactor undergoes complete mix aeration, during a specific aeration cycle, for which variable volume complete mix kinetics can be ascribed to that specific volume. Following the specific non-aeration sequence, during which time a solids layer and an upper supernatant layer segregate, the relative depths being dependent upon the contact flow history of influent wastewater and the mixed liquor solids concentration of a stream of solids, which is directed from the principal variable—volume completely mixed volume to the influent stream of wastewater for admixture. This embodiment of operation requires a means of removing a specified fraction of the supernatant upper layer during the continued non-aeration sequence. When this event is completed, the aerated sequence is continued with further admixture of reactants as prescribed previously.

While not limiting the embodiment of the invention, t he mode of operation of fed-batch reactor treatment methodology is most easily conducted in more than one basin module. Cycles of aeration operation can be easily set for 2 hours and other two basin multiples. Other cycles of operation can be set for 3 basins, and other additions, for either even or odd basin operation. The embodiment of the invention while not limited to the basin modules, is easily explained as a two basin operation. Those experienced in the art will be able to extrapolate from the two basin operation used in this discussion.

Whilst upstream reaction volumes have an important bearing on the efficiency of the treatment methodology, the principle requirement is that there is a major volume fraction of the fed-batch reactor volume, in excess of 50%, that undergoes variable volume complete mix reaction conditions, using a specific device for combined aeration and mixing.

While it is preferable that a system of diffused aeration is used, this does not necessarily limit the application of the invention. Two set-ups for the invention will be described. Both configurations require the use of a dissolved oxygen sensor having an acceptable response time for measuring a rate of change of dissolved oxygen concentration ($do_2/dt$).

Previous discussion has explained the importance of load demand and load supply of dissolved oxygen, relative to substrate load, load application time and viable fraction of biomass.

The first configuration requires the use of a suitable dissolved oxygen sensor, complete with the electronics that are necessary to enable the measurement of the rate of change of dissolved oxygen concentration as a control signal, through the use of a specific computer or other programmable logic controller, through which output signals are generated, which allow interactive control of the rate of introduction of air into the complete-mix reactor (and/or other fluidly connected reactor volumes), during the aeration sequence. Interactive control is through the duration of the aeration sequence combined with the flow of air through a speed control mechanism on the generation of the air supply or in the flow of air through a position control mechanism of a suitable control valve, as a means of restricting the flow of air. Control of the airflow by either means results in the control of the mass rate of transfer of dissolved oxygen to the complete-mix fed batch reactor.

In the first preferred embodiment the invention requires a minimum of one reactor vessel, preferably operated as a fed-batch reactor, which operates as a variable volume activated sludge reactor basin. During the process of filling and aeration where more than one vessel compartment is used, these will be in fluid communication.

An important feature of the invention is the manner and means by which the wastewater to be treated is introduced into the means for reaction. Also important is the initial mass ratio of activated sludge solids that is caused to come into contact with the influent waste flow. Of further importance is the time of interaction of these component flows and the means by which intermixing and intermeshing of the two flow streams is maintained. One method employed in the industry utilises either fixed sub surface or floating surface electrically operated propellers which cause a directional flow to take place and an intermixing of solids and liquid phases through the expenditure of energy. The invention can be used with this means of operation. The preferred embodiment of the invention contains no specially installed equipment of the type referred to. Mixing in this invention is variously caused through the operation of the means for aeration, which is essential to the aerobic degradation and anomic degradation processes that are maintained and or the design of combined flow conditions using conduits, channels and flow directional baffles.

It has been found that there are benefits in process that derive from the means of introducing the relative proportions of activated sludge solids and wastewater, the time of flow-mixed contact of these two streams and the manner in which kinetic natural mixing is used during the initial contacting reaction period. While not omitting the application of the invention, the combined initial reaction time is designed to ensure a minimum of 65% removal of the readily degradable soluble substrate fraction contained in a wastewater. This fraction can be variable in wastewaters. By way of example, for a BOD of around 300 mg/l, Aand an associated COD of around 600 mg/l, in a domestic wastewater, and for a typical reticulation design, a 25% readily degradable soluble substrate fraction assumption base will give acceptably good process results. A process reaction time of twenty to around sixty minutes hydraulic retention tiae within the biological selector will normally generate the desired result, provided the copartmentalisation required of the inlet configuration design performs with the correct degree of dispersion together with an appropriate mixing energy that enhances biological floc nucleation and aggregation. The relative placement of overflow and underflow baffles relative to designated bottom water level and the reactor basin floor is a feature of the invention. The open area of the underflow baffle is restricted to generate a high underflow energy which is more than three times greater than the mean flow energy across the overflow weir. The underflow free area uses a fraction of the available length of the underflow baffle. Thus high mixing energy regimes are generated near to the reactor basin floor sections which are followed by reduced energy fluctuation-aggregation zones at the upper zone, formed by the overflow baffles. The inlet configuration geometry in designed to promote pulsed energy zones which ensure floc transport and floc growth, together with the biological reactions of soluble BOD removal and conversion to intracellular storage products, partial denitrification and phosphorus release by the biological phosphorus sequestering micro-organisms that are caused to grow in the biomass.

While all of the processes referred to above take place in a single vessel embodiment, a preferred embodiment utilises a four (4) basin facility or a four (4) module facility. each module can comprise one (1) to N (where $N \geqq 1$) basin combinations. The factoring on 4 modules is dependent on the set (design) four (4) hour cycle upon which the basin geometry is designed. To those experienced in the art it is obvious that other factoring numbers such as 3 and 5 can equally be used. Such design satisfies specific requirements for load hydraulic) division, organic load manipulation, biological treatment (including concurrent nitrification-denitrification and biological phosphorus removal) provision of oxygen demand by automatic biorate control, maximisation of oxygen transfer efficiency, optimisation of solids-liquid separation relative to the decant depth and decant removal rate of treated effluent. The four module preferred embodiment operates in every way as a net continuous process, with acceptance of influent on an as received basis with a continuous discharge of effluent from the plant, the flow rate being an hourly constant rate relative to the actual decant volume that is removed from each module. A different protocol can be run whereby the discharge rate is constant at each decant sequence. The preferred embodiment is configured for a flow split operation followed by the four module (basin) processing. A module can be configured with influent at one end of the module (basin) and effluent decanting at the opposite end or with effluent decanting at the remote end of the module (basin) but located on the long basin walls (see FIGS. 6(*a*) to 6(*g*)). Typically a domestic wastewater containing 300 mg/l TSS, 55 mg/l TKN which is to be treated to a flow range of 6×ADWF will require an inlet configuration zone of up to 8% of the total vessel area. This zone is divided into a minimum of 5 and typically between 8 and 14 sub zones for each principal reactor each having a volume fraction that initially generates an oxygen uptake rate in the first mixed zone of in excess of 20 mg $O_2$/gVSS/hr. The volume fraction of mixed liquor suspended solids from the main reactor volume will typically be in excess of 20% and less than 33% of average influent flow. Under overflow baffle arrangement terminates on either side of the reactor basin such that half of the combined flow discharges to a position on either side of the principal reactor basin.

Pumped mixed liquor suspended solids continues throughout the duration of the complete cycle. Influent wastewater is interrupted during the settle sequence. Waste sludge is collected from zone subsequent to the inlet configured biological selector, and removed during an aeration sequence or during the non-aeration settle sequence. Reactor basin dimensioning is typically based on up to 15 kg MLSS/$m^2$ of reactor area; and for efficient nutrient removal in domestic wastewater, a BOD load of 0.33–0.40 kg BOD/ m³ at a fractional decant volume of 0.46. Decant liquid depth removal is up to 38 mm/min. without the addition of phosphorus precipitant. With the addition of phosphorus precipitant, for normal dry weather treatment operation this depth rate can be increased to 44 mm/min. Basin solids flux load is up to 15 kg MLSS/m² and up to 10 kg TKN/kg MLSS/m²/d, within 20% for the former and within 30% for the latter.

A further development of the system incorporates attached growth media to enhance the volumetric biomass load that can be accommodated in the system. For this embodiment the variable volume reactor basin is divided into three zones.

The first is the biological selector zone which is sized for domestic wastewater generally as per the above description. For organic industrial wastewaters this fraction is increased to occupy approximately 12% of the basin surface area. The zone is compartmentalised as described to effect successive removal of soluble substrate. The first zone is followed by a second zone in fluid communication. The return flow of mixed liquor solids from zone 3 to zone 1 for applications where the influent BOD is up to 2000 mg/l or zone 2 to zone 1 increases to two to three times the average influent flow. the caged random pack media is contained in a flow through cage. Zones 1 through 3 are in continuous fluid communication. Random packing in zone 2 is approximately 0.4 metres from the reactor basin floor and to within 0.15 metres below designated bottom water level. Zone 2 is fitted with means for varying aeration intensity, zone 1 has aeration diffusers connected to valves which allow coarse aeration/ mixing control.

It will be obvious to those experienced in the art that the same mode of operation and control applies to the treatment of wastewaters for carbon removal only, for carbon and nitrogen removal, for carbon and phosphorus removal and for carbon and nitrogen and phosphorus removal.

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

I claim:

1. A method of treating waste material forming at least a part of a biomass comprising a single activated sludge in a variable depth bioreactor using controlled intermittent and successive aeration sequencing and liquid decantation to concurrently grow and maintain a culture of autotrophic, heterotrophic and facultative micro-organisms in the sequentially aerated single activated sludge for the biological removal of the organic carbon, nitrogen and phosphorus components from wastewater admitted to the bioreactor, said biomass being located in a variable depth operated reactor having at least two interconnected zones in series connection in which one of the zones is a first reaction zone and the other zone in a second or last zone, wherein at least a part of the treated contents of the second zone of the reactor is recycled to a partially segregated non-aerated volume of the first reactor zone for admixture with incoming influent waste, at least during an aeration sequence of operation of the second or last of the variable depth operated reactor, wherein the method comprises using one dissolved oxygen concentration sensor or probe means for automatically and continuously monitoring dissolved oxygen concentration in the biomass in the second or last zone of the variable depth reactor, said sensor or probe means being located in the biomass at a location such that at least that part of the biomass in that location is in motion during the time of automatically and continuously measuring the dissolved oxygen concentration, whereby the single sensor or probe means is used to cause operation of an oxygen input means during input into and aeration of the wastewater in the second or last zone, in combination with computer means to operate algorithms in order to operate to a set protocol of successively increasing dissolved oxygen concentration from zero to about 2.5 Mg/L in discrete predetermined adjustable time increments to optimize the retention of adsorbed organic substance within the biomass while maintaining co-current and optimal nitrification and denitrification during aerated operation, with phosphorus release during non-aeration and phosphorus uptake during adjacent and reactive influent aeration sequences, with the detection and automatic calculation of the oxygen utilization rate of that biomass in the second or last variable volume zone which adjusts the length of each aeration sequence exposure of the biomass, said determination and adjustments being characterized by the biomass in the second or last zone of the reactor having a potential oxygen uptake rate, measured using an aerated admixture of 80%/20% single sludge biosolids/influent mixture, being in excess of about three times the measured uptake rate of the single sludge biosolids as measured by the single dissolved oxygen sensor, such that combined with the preset oxygen transfer rate and the potential oxygen uptake causes a limitation to the nitrogen oxidation product to essentially nitrite nitrogen form, and to cause by aerated mixing in the second or last variable volume zone a concurrent reduction reaction of the nitrite nitrogen to essentially nitrogen gas, in such a way that at the end of the aeration sequence, the biomass oxygen utilization rate is automatically controlled to an operating set point, adjunctively with the introduction of air into one or more partially segregated volumes within the first zone of the reactor to partially limit the release of phosphate in the biological phosphorus removal mechanism, such that the first zone of the biological reactor can be continuously and automatically controlled to limit oxic, anoxic and anaerobic successive reaction environments in the first zone of the variable depth biological reactor.

2. The method of claim 1, wherein the waste is domestic, industrial or commercial wastewater, including human wastes, body washing wastewater, clothes washing wastewater, food preparation wastewater, and combinations thereof.

3. The method of claim 2, wherein the last reaction zone is more than 50 percent of the total reaction volume, and the first zone receives mixed or unmixed contents, recycled from the second or last reactor zone for admixture with incoming waste.

4. The method of claim 1, wherein up to 40 percent of the design depth of the variable depth reactor is removed during the decantation step at a rate that does not cause removal of settled solids from within a settled sludge layer in the reactor.

5. The method of claim 1, wherein the second or last reactor zone is provided with oxygen transfer diffusion grids located at or towards the floor or base of the principal reactor.

6. The method of claim 5, wherein the bioreactor is provided with at least one air supply line provided with at least one motor operated control valve, so that the motor/ operated control valve(s) can be alternately opened for a set program of air-on operation in a cycle and then closed.

7. The method of claim 6, wherein all of the motor operated control valves are operated in unison during the aeration sequence, or some of the valves are closed, or all of the valves are opened and closed according to a preset sequence of operation.

8. The method of claim 1, wherein the net fluid oxidation reduction potential of the combined liquid stream passing through the initial reaction zone obtains a value of less than about −150 mV as compared to a hydrogen reference electrode.

9. The method of claim 1, wherein up to 40 percent of the total bioreactor volume is introduced into the first zone during a time which is equivalent to the cycle time less the liquid removal air-on/off time sequence.

10. The method of claim 1, wherein the-cyclic air-on time exposure of the biomass and the amount of recycled treated waste admixed with the influent wastewater is sufficient to yield a less than −150 mV oxidation reduction potential in a time of less than 80 minutes.

11. The method of claim 1, wherein the oxidation reduction potential of segregated sludge in the second or last reaction zone falls substantially to less than −150 mV within 90 minutes into the air-off sequence.

12. The method of claim 1, wherein the solids concentration of the biologically activated sludge of the second or last mixed reaction zone is up to about 5000 mg/L.

13. The method of claim 1, wherein the bioreactor is formed with vertical walls of reinforced concrete or structural steel or formed as a slope walled lagoon structure having earthen, concrete stabilized, membrane lined or concrete retaining walls.

14. The method of claim 1, wherein the biomass remains in motion for up to 10 minutes after interruption of-the supply of air or oxygen.

15. The method of claim 1, wherein the values of dissolved oxygen concentration are automatically sensed and monitored in situ substantially continuously but not less than at intervals of 10 to 20 seconds during the total air-on and air-off sequences of each cycle.

16. The method of claim 1, wherein the use of the cycles of operation are managed by the measurement of the oxygen utilization rate in order to adjust it to appropriate values to provide for the satisfaction of reactor stoichiometiric oxygen demand which permits a single air supply to service one or more two zones of the bioreactor.

17. The method of claim 1, wherein the dissolved oxygen concentration sensor or probe is an electronic oxygen sensor able to measure the rate of change of dissolved oxygen concentration as a 4–20 milliamp primary control signal.

18. The method of claim 17, wherein the oxygen sensor is located within the second reactor about 30 cm from the surface of the second reactor floor, or in a full-flow conduit or pipe through which part of the liquid/solid material from the second reactor flows to the influent admission reactor.

19. The method of claim 1, wherein the TKN loading on the activated sludge is up to about 0.01 kg TKN/kgMLSS/M$^2$/d for typical domestic sewage applications.

20. The method of claim 1, wherein the total phosphorus loading of activated sludge solids is up to about 0.002 kg Phosphorus/kgMLSS/M$^2$/d for typical domestic sewage applications.

21. The method of claim 1, wherein the dissolved oxygen concentration in the principal reactor is controlled to less than 0.7 mg/L (average) for 75 percent of the air-on time and to between 2 and 3 mg/L for the remaining air-on time period.

22. The method of claim 1, further comprising:
microbially treating the wastewater in the presence of a micro-organism population acclimated to the wastewater contaminants and their concentrations in the wastewater, said micro-organism including,
nitrifying micro-organisms capable of converting nitrogen to at least nitrite nitrogen,
facultative micro-organisms capable of denitrifying nitrite and optionally nitrifying organisms capable of converting nitrite to nitrate nitrogen, and
facultative micro-organisms capable of reducing nitrate to nitrite nitrogen to nitrogen gas and phosphorus removal micro-organisms capable of biologically removing available soluble phosphorus.

23. The method according to claim 1, wherein the mixed liquor solids concentration in the second or last reactor is sensed and recorded at the moment that the air supply to that reactor in terminated and the oxygen uptake rate is sensed, recovered and analyzed following termination of the process oxygen supply and the liquid level at the time of closure of the influent valve to the reactor plus two minutes.

24. The method of claim 23, wherein the sensed process values are processed and used to determine:
the waste sludge pumping time,
the duration of the air-on sequence for the next cycle,
the mass flow rate of air for the next cycle,
adjustment of the dissolved oxygen concentration set-points,
such that the process conditions are sufficient to maintain the set-point oxygen uptake rate in the principal reactor determined at the end of the previous aeration sequence.

25. The method of claim 1, wherein a pH correction is made to the influent wastewaters.

26. The method of claim 1, further including a flow path of admixed components from the first zone of the bioreactor wherein the flow path has successive passes from adjacent the reactor floor to the liquid surface of the reactor in transit to an adjacent zone of the bioreactor, in which the mixing energy associated with the flow path near the reactor floor of the first reactor compartment is a minimum of 3 times the mixing energy associated with the flow path near to the liquid surface in succession thereby causing localized energy pulsation, nucleation and flocculation of the admixture.

27. The method of claim 1, wherein the set-point oxygen uptake rate is experimentally determined and is up to 20±4 mgO$_2$/gVSS/hour (referenced to 20° C.).

28. The method of claim 1, wherein in which there are four bioreactors, or four modules forming the bioreactor and a flow splitter arrangement for distributing influent waste to each bioreactor or each module wherein each bioreactor or each module functions an a single bioreactor.

29. The method of claim 28, wherein each bioreactor comprises an influent position, configured inflow admixture compartments and an effluent decanting device comprising a moving liquid receiving channel designed to exclude surface floating material to effectively remove up to 40% of the bioreactor depth.

30. The method of claim 28, wherein the oxygen uptake rate or measured potential oxygen uptake rate in the initial admixture reactor is at least 20 mgO$_2$/gVSS/hr.

31. An apparatus for biologically removing carbon, nitrogen and phosphorus from wastewater, in the form of a partially enclosed water-retaining, multi-zone, variable-depth, cyclically-aerated reactor comprising at least a first hydraulic zone and a last hydraulic zone separated by a partial wall structure allowing fluid communication and transfer between the zones at least during a part of an air-on sequence, an aerator for selectively exposing the contents of the reactor to repeated air-on and air-off sequences, said first hydraulic zone provided with an inlet for introducing influent wastewater to the first zone during at least the air-on sequence, said last hydraulic zone for allowing separation of the wastewater into at least supernatant clear liquor, an aerator including a grid air bubble generation system for providing combined mixing and oxygen transfer in at least the last hydraulic zone mounted on the floor of the reactor and a means for directing a flow of process air to the reactor for in-reactor oxygen transfer at least two different mass flow rates during the air-on sequence, means for interrupting the flow of influent wastewater to the first hydraulic zone at least during a part of the air-off sequence, means for removing liquid contents from the last hydraulic zone to a position remote from the reactor during at least the air-off sequence, means for transferring the contents from the last hydraulic zone to the first inlet hydraulic zone at least during the air-on sequence, means for interrupting influent wastewater flow and the flow of process air to the reactor during at least a part of the air-off sequence, means for reducing the amount of supernatant clear liquid retained in the last hydraulic zone during the air-off sequence to a preselected lower level using a motor-driven decanter comprising a horizontal weir box, fitted with a positive floating solids excluding scum guard, connected by at least one downcomer member to a rotating drum shaft provided with liquid retaining seals and airlock release pipes, means for automatically maintaining an optimum mixture of process acclimated heterotrophic, autotrophic and facultative micro-organisms and wastewater through the continuous measurement of the rate of change of dissolved oxygen concentration in the reactor together with measurement of the potential oxygen utilization rate of the biomass, said rate change of dissolved oxygen being measured by a single dissolved oxygen sensor located in the biomass, such that at least part of the biomass is in motion at the time the measurement is taken in order to provide an indication of the utilization rate as a function of time, a means for analyzing successive rates of change of oxygen concentration taken at the end of each air-on sequence in the last hydraulic zone, a means for continuously measuring the rate of change of dissolved oxygen concentration at the beginning of each air-on sequence, means for adjusting set point operating positions of the rate of change of dissolved oxygen in the last hydraulic zone of the reactor taking into account process air flow rate, air-on time adjustment and mixed heterotrophic, autotrophic and facultative micro-organism culture, means for adjusting and operating with at least four set point positions for the dissolved oxygen concentration as a function of time profile in each air-on cycle in the last hydraulic zone in order to achieve an indication of the termination of the air-on sequence set point dissolved oxygen concentration rate of use, means for automatically adjusting the operating time duration of each total cycle and successive cycle, means for operating with and determining the duration of air-off sequence time in successive cycle times in the last hydraulic zone, means for operating with and determining the time-based flow rate of process air introduced to the reactor, and means for determining and executing the time of operation within each cycle for the removal of a predetermined volume of a mixture of biomass and wastewater in successive air-off sequences from the reactor.

32. The apparatus of claim 31 further including computer means for carrying out the process of claim 1.

* * * * *